(12) United States Patent
Baughman et al.

(10) Patent No.: US 10,304,003 B2
(45) Date of Patent: May 28, 2019

(54) SYSTEM AND METHOD FOR OPTIMIZING TEAMS

(71) Applicant: International Business Machines Corporation, Armonk, NY (US)

(72) Inventors: Aaron K. Baughman, Silver Spring, MD (US); Phaedra K. Boinodiris, Apex, NC (US); Barry M. Graham, Silver Spring, MD (US); Russell R. Vane, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/194,782

(22) Filed: Jun. 28, 2016

(65) Prior Publication Data

US 2016/0307111 A1 Oct. 20, 2016

Related U.S. Application Data

(63) Continuation of application No. 14/079,055, filed on Nov. 13, 2013, now Pat. No. 9,430,741, which is a
(Continued)

(51) Int. Cl.
*G06N 5/04* (2006.01)
*G06N 7/00* (2006.01)
(Continued)

(52) U.S. Cl.
CPC ............ *G06N 7/005* (2013.01); *G06N 5/047* (2013.01); *G06N 20/00* (2019.01); *G06N 99/005* (2013.01);
(Continued)

(58) Field of Classification Search
USPC ......................................................... 706/45
See application file for complete search history.

(56) References Cited

U.S. PATENT DOCUMENTS

| 8,712,945 B2* | 4/2014 | Baughman ............. G06Q 10/06 706/45 |
| 2009/0043621 A1 | 2/2009 | Kershaw |
| 2009/0164443 A1 | 6/2009 | Ramos et al. |

FOREIGN PATENT DOCUMENTS

CN 102072747 A 5/2011

OTHER PUBLICATIONS

Dorn et al., "Composing Near-Optimal Expert Teams: A Trade-Off between Skills and Connectivity", OTM 2010, Part 1, LNCS 6426, pp. 472-489, 2010.
(Continued)

*Primary Examiner* — Wilbert L Starks
(74) *Attorney, Agent, or Firm* — Daniel Simek; Hoffman Warnick LLC

(57) ABSTRACT

A system, method and program product for optimizing a team to solve a problem. The system includes: a team building system for building a fundamental analytic team from a database of analysts to solve an inputted problem, wherein the fundamental analytic team includes at least one cluster of analysts characterized with specificity and at least one cluster of analysts characterized with sensitivity; and a problem analysis system that collects sensor data from the fundamental analytic team operating within an immersive environment, wherein the problem analysis system includes a system for evaluating the sensor data to identify a bias condition from the fundamental analytic team, and includes a system for altering variables in the immersive environment in response to a detected bias condition.

14 Claims, 6 Drawing Sheets

Related U.S. Application Data continuation of application No. 13/362,632, filed on Jan. 31, 2012, now Pat. No. 8,712,945.

(51) Int. Cl.
   *G06N 20/00* (2019.01)
   *G06Q 10/06* (2012.01)
   *G06N 99/00* (2019.01)
   *G06Q 50/00* (2012.01)

(52) U.S. Cl.
   CPC .............. *G06Q 10/06* (2013.01); *G06N 5/04* (2013.01); *G06Q 50/01* (2013.01)

(56) References Cited

OTHER PUBLICATIONS

Dorn et al., "Interaction Mining and Skill-dependent Recommendations for Multi-objective Team Composition", Distributed Systems Group, Vienna University of Technology, Apr. 29, 2011, 29 pages.

Japanese Patent Office, Office Action for CN Application No. 103226566 dated Aug. 19, 2015, 5 pages.

Liu et al., "Research of Sampling-based Multi-model Distribution Clustering Algorithm", Computer Engineering, vol. 36, No. 24, Dec. 2010, 3 pages (English Abstract).

Neeman et al., "Lecture: Condorcel's Theorem", Social Networks and Social Choice, Aug. 2010, pp. 1-5.

Pryag et al., The value of analysts' consensus recommendations; Evidence from South African brokerage houses, Investment Analysts Journal, No. 63, pp. 1-14.

Santos et al., An Ontology-Based Approach to Interoperability for Bayesian Agents, AAMAS '07, Proceedings of the 6th International Joint Conference on Autonomous Agents and Multiagent Systems, Article No. 231, May 14-18, 2007, pp. 1312-1314.

Starks, U.S. Appl. No. 13/362,632, Notice of Allowance and Fees Due, dated Sep. 27, 2013, 12 pages.

Starks, U.S. Appl. No. 14/079,055, Notice of Allowance and Fees Due, dated May 20, 2016, 10 pages.

Wallace et al., "Terms as technology: applying theory and research to model macrocognition processes in teams", Theoretical Issues in Ergonomics Science, vol. 1, No. 4, Jul.-Aug. 2010, pp. 359-374.

\* cited by examiner

Agglomeration Schedule

| Stage | Cluster Combined | | Coefficients | Stage Cluster First Appears | | Next Stage |
|---|---|---|---|---|---|---|
| | Cluster 1 | Cluster 2 | | Cluster 1 | Cluster 2 | |
| 1 | 5 | 14 | 38.000 | 0 | 0 | 4 |
| 2 | 2 | 8 | 44.000 | 0 | 0 | 3 |
| 3 | 2 | 12 | 50.000 | 2 | 0 | 13 |
| 4 | 5 | 11 | 64.500 | 1 | 0 | 8 |
| 5 | 4 | 7 | 70.000 | 0 | 0 | 6 |
| 6 | 4 | 13 | 72.500 | 5 | 0 | 7 |
| 7 | 1 | 4 | 74.889 | 0 | 6 | 10 |
| 8 | 3 | 5 | 79.667 | 0 | 4 | 9 |
| 9 | 3 | 15 | 78.813 | 8 | 0 | 10 |
| 10 | 1 | 3 | 75.865 | 7 | 9 | 11 |
| 11 | 1 | 10 | 103.457 | 10 | 0 | 12 |
| 12 | 1 | 16 | 122.000 | 11 | 0 | 13 |
| 13 | 1 | 2 | 166.534 | 12 | 3 | 15 |
| 14 | 6 | 9 | 194.000 | 0 | 0 | 15 |
| 15 | 1 | 6 | 377.587 | 13 | 14 | 0 |

FIGURE 5

SYSTEM AND METHOD FOR OPTIMIZING TEAMS

BACKGROUND

The present invention relates to assembling teams to solve a problem, and more particularly relates to a system and method of assembling a team for solving a problem within an immersive environment that accounts for individual and group biases.

The selection of a team to solve a problem is fraught with any number of possible problems. Individuals and groups are prone to all types of biases that can lead a team to an incorrect conclusion. Moreover, team based outcomes can depend on the types of environments the members are immersed within.

Immersive environments, social decision making, and the interactions between humans and systems produce data for the development of predictive and prescriptive models. At intersection are analytics, social psychology, and immersive technologies. The use of immersive environments within the context of social interaction paradigms enables the wisdom of many minds, e.g., following the Condorcet jury theorem. Condorcet's jury theorem is a theorem about the relative probability of a given group of individuals arriving at a correct decision.

The prevention of knowledge cocoons, information cascades, decision polarization, and the attachment to premature hypothesis is a core component of data analysis. The accelerating data avalanche where data is producing even more data perpetuates the need of turning information into knowledge for the consumption of parallel analysis. Such group, crowd, or team work sourcing produces precursors for the aggregation of fuzzy social decisions. Social or group dynamics produce fuzzy decisions or effective errors that are magnified as higher ply groups aggregate lower ply groups' decision until a root analysis is completed. Predictive social decision analytics reduces team effective errors by recommending a team, social paradigm, and immersive environment to maximize individual analysis for the correct team decision.

BRIEF SUMMARY

In a first aspect, the invention provides a system for optimizing a team to solve a problem, comprising: a team building system for building a fundamental analytic team from a database of analysts to solve an inputted problem, wherein the fundamental analytic team includes at least one cluster of analysts characterized with specificity and at least one cluster of analysts characterized with sensitivity; and a problem analysis system that collects sensor data from the fundamental analytic team operating within an immersive environment, wherein the problem analysis system includes a system for evaluating the sensor data to identify a bias condition from the fundamental analytic team, and includes a system for altering variables in the immersive environment in response to a detected bias condition.

In a second aspect, the invention provides a program product stored on a computer readable storage medium for optimizing a team to solve a problem, comprising: program code configured for building a fundamental analytic team from a database of analysts to solve an inputted problem, wherein the fundamental analytic team includes at least one cluster of analysts characterized with specificity and at least one cluster of analysts characterized with sensitivity; and program code configured for collecting sensor data from the fundamental analytic team operating within an immersive environment, including program code configured for evaluating the sensor data to identify a bias condition from the fundamental analytic team, and program code configured for altering variables in the immersive environment in response to a detected bias condition.

In a third aspect, the invention provides a method for optimizing a team to solve a problem, comprising: building a fundamental analytic team from a database of analysts to solve an inputted problem, wherein the fundamental analytic team includes at least one cluster of analysts characterized with specificity and at least one cluster of analysts characterized with sensitivity; collecting sensor data from the fundamental analytic team operating within an immersive environment; evaluating the sensor data to identify a bias condition from the fundamental analytic team; and altering variables in the immersive environment in response to a detected bias condition.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

FIG. 5 depicts agglomeration schedule associated with the dendrogram of FIG. 4.

Figure 1:
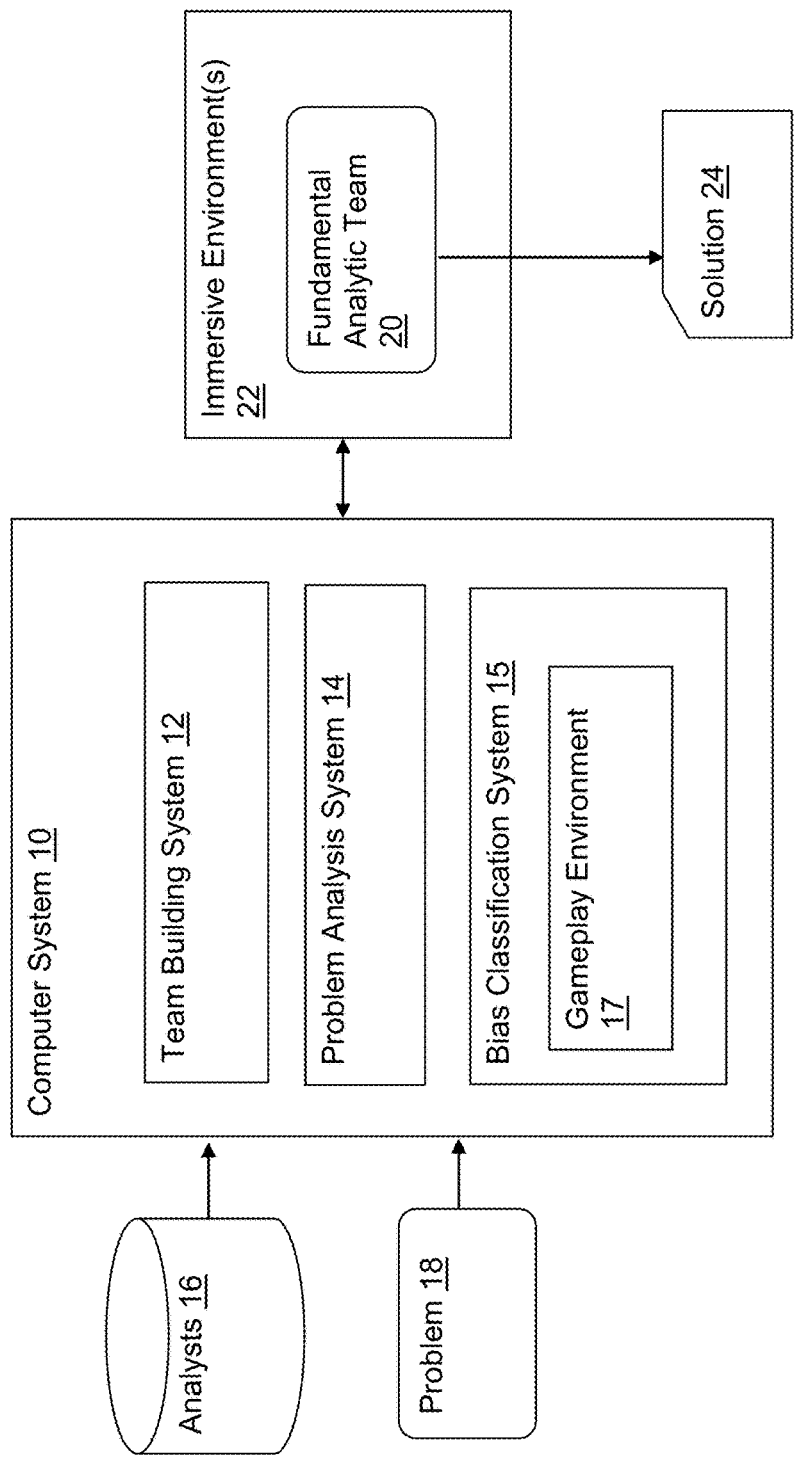
FIG. 1 depicts a system overview of a problem solving system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

FIG. 1 depicts a general overview of a system for implementing an approach for arriving at an answer 24 based on an inputted problem 18. A computer system 10 is provided that includes: (1) a team building system 12 for assembling a fundamental analytic team 20 from a database of analysts 16 to address the problem 18; (2) a problem analysis system 14 that manages the problem solving process (i.e., analysis) for the fundamental analytic team 20; and (2) a bias classification system 15 to identify and classify biases that can be used to facilitate both the team building system 12 and problem analysis system 14. In one illustrative embodiment described herein, bias classification system 15 uses a gameplay environment 17 to identify, classify and manage biases.

Once assembled, the fundamental analytic team 20 is tasked to provide a solution 24 to the problem 18 by working within one or more immersive environments 22. As described in further detail, immersive environment 22 is controllable by the problem analysis system 14. Illustrative immersive environments 22 may for example include virtual spaces, physical spaces, computer networks, gaming environments, etc.

Figure 2:
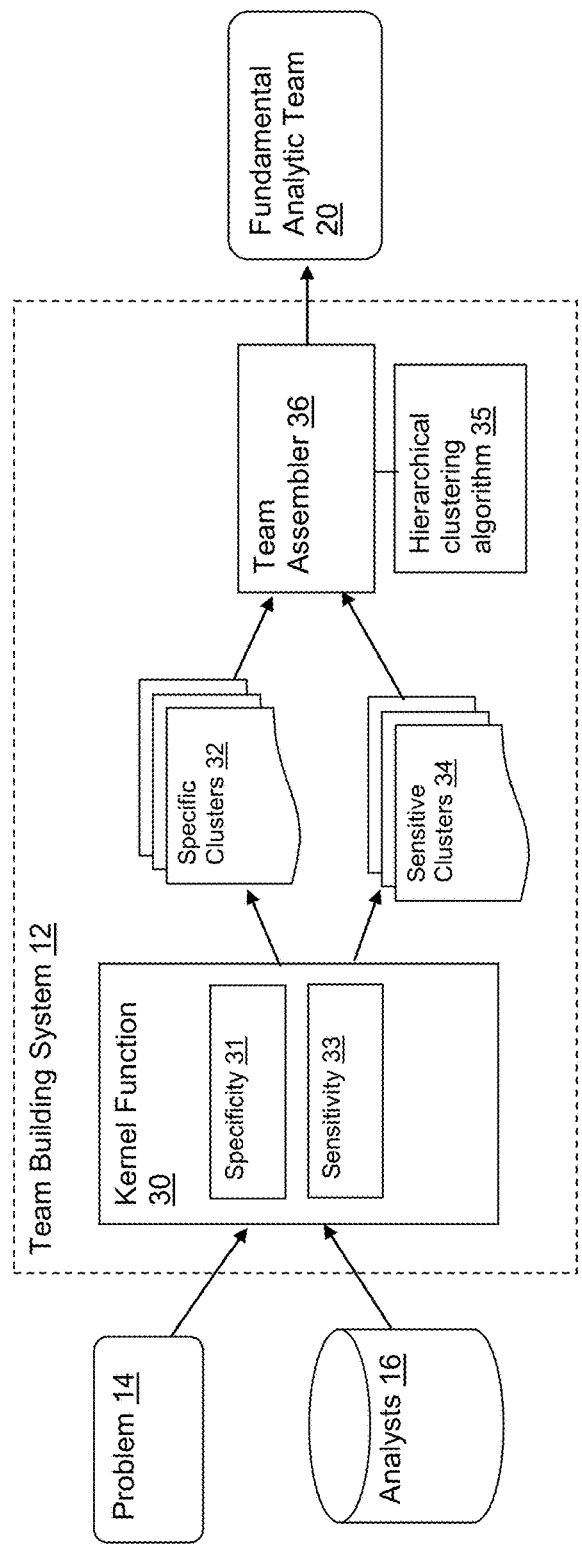
FIG. 2 depicts a team building system in accordance with an embodiment of the present invention.

FIG. 2 depicts a more detailed view of team building system 12. Central to the team building system 12 is a kernel function 30 that analyzes and clusters analysts from a database of analysts 16. Analysts 16 are generally characterized for the inputted problem 14 as belonging to one two personality types, specificity 31 and sensitivity 33. Analysts 16 characterized with specificity are generally unlikely to give a false positive, e.g., they are unlikely to incorrectly answer "yes". Conversely, analysts 16 characterized with sensitivity are generally unlikely to give a false negative, e.g., they are unlikely to incorrectly answer "no". Team building system 12 seeks to combine a set of analysts that are highly specific with a set of analysts that are highly sensitive. Kernel function 30 may for example utilize homophilic based modeling to cluster analysts 16 that have common characteristics.

Sensitivity and specificity are statistical measures of the performance of a binary classification test, also known in statistics as classification function. Sensitivity (also called recall rate in some fields) measures the proportion of actual positives which are correctly identified as such (e.g., the percentage of sick people who are correctly identified as having the condition). Specificity measures the proportion of negatives which are correctly identified (e.g., the percentage of healthy people who are correctly identified as not having the condition).

In one illustrative embodiment, kernel function 30 reads in: (1) a problem vector that describes the problem 14; and (2) a set of attribute vectors that describe the analysts 16. All attribute vectors are within a corresponding member, $\forall$ $\vec{u}_i \in m_i$. An attribute vector is defined by: $\vec{u}_i = \{a_1, a_2, \ldots, a_n\}$; $0 < n \leq i$; $i \in N$. Attributes may include anything that describes an associated analyst 16, e.g., education level, experience, introvert rating, gregariousness, etc.

A problem vector $p_k$ describes an analytical topic from a predefined taxonomy such that $\vec{p}_k = \{p_1, p_2, \ldots, p_m\}$; $0 < m \leq k$; $k \in N$. A first function $f_m$ provides member normalization scores while a second function $f_p$ enables problem vector normalization.

A parametric kernel of projecting dimensional data onto a morphed dimensional space vectors data into similar sparse groups. A function, $g(\vec{x}, \vec{w})$, creates a mapping of input vector $\vec{x}$ to output vector $\vec{y}$ with $\vec{w}$ weights. A training phase selects $\vec{w}$ that minimizes real classification error. The function g is a kernel function 30 for feature vectors $p_k$ and $u_i$ such that $g(<\vec{u}_i, \vec{p}_k>, \vec{w}) \Leftrightarrow g(\vec{S}, \vec{w}) = \vec{S}_f$.

$$Sp = \frac{TN}{TN + FP}$$

$$Se = \frac{TP}{TP + FN}$$

where Sp is specificity, Se is sensitivity, TN are the number of true negatives, TP are the number of true positives and FN are the number of false negatives.

The output of kernel function 30 is two types of clusters, specific clusters 32 and sensitive clusters 34. A team assembler 36 then employs a hierarchical clustering algorithm 35 that combines one or more clusters from each cluster type to build the resulting fundamental analytic team 20.

Hierarchical clustering algorithm 35 is defined by the structure of data to be processed and the behavior as to how the data should be processed. From this data structure, classifiers follow a strict taxonomy. At the first level, a classifier can be either exclusive or overlapping. If each object belongs to one class, the classification is exclusive. However, if cluster sets are not disjoint, the classifier becomes overlapping. The cluster creation process is either intrinsic or extrinsic. An algorithm is considered intrinsic if a proximity or feature matrix is solely used to learn classes within data. However, data labels or targets indicate that an extrinsic measure will produce clusters. Intrinsic is commonly known as unsupervised learning while extrinsic is synonymous with supervised learning. A third division within the taxonomy for exclusive and intrinsic algorithms include hierarchical and partitional. Hierarchical clustering is a chain of partitions where each ply or hierarchy level is a partition.

Following data structure decisions, classification algorithms have several differing behaviors for the processing data. Within any classification algorithm, any number of features can be selected at any iteration. A monothetic algorithm will use one data feature at a time. Alternatively, the use of all data features during classification is referred to as polythetic. Data feature processing helps to guide an algorithm to decide to merged or split a class or cluster. Class splitting is referred to as divisive while merging is called agglomerative. If all data begins within one class, the method will divide the least correlated data into separate class(es). However, agglomerative behavior initializes a cluster for each data object and merges like objects into classes. As new classes are formed, the center of the space can be updated after all data elements have been grouped, parallel, or after a single data element has been grouped, serial.

The desired output of a fundamental analytical team 20 with a series of immersive environments given the structure and form of analyst user data provides enough bounds to select a pattern recognition algorithm's behavior and form. To achieve the dynamic construction of a fundamental analytical team, $T_a^f$, along with a series of immersive context selections, the following algorithm is appropriate:

$$HC_1 = \begin{cases} \text{Taxonomy: exclusive, intrinsic, hierarchical} \\ \text{Behavior: agglomerative, serial, polythetic} \end{cases}$$

All members, m, within $T_a^f$ are selected from the criterion $$Pr\left(\left(\sum_{m=0}^{Cl} X_m\right) = t\right) = 100\%$$

where $T_a^f$ is the fundamental team. However, the fundamental team is created after all m members have been divisively clustered as described in the algorithm shown in Table A.

TABLE A

Agglomerative Hierarchical Clustering

Figure 4:
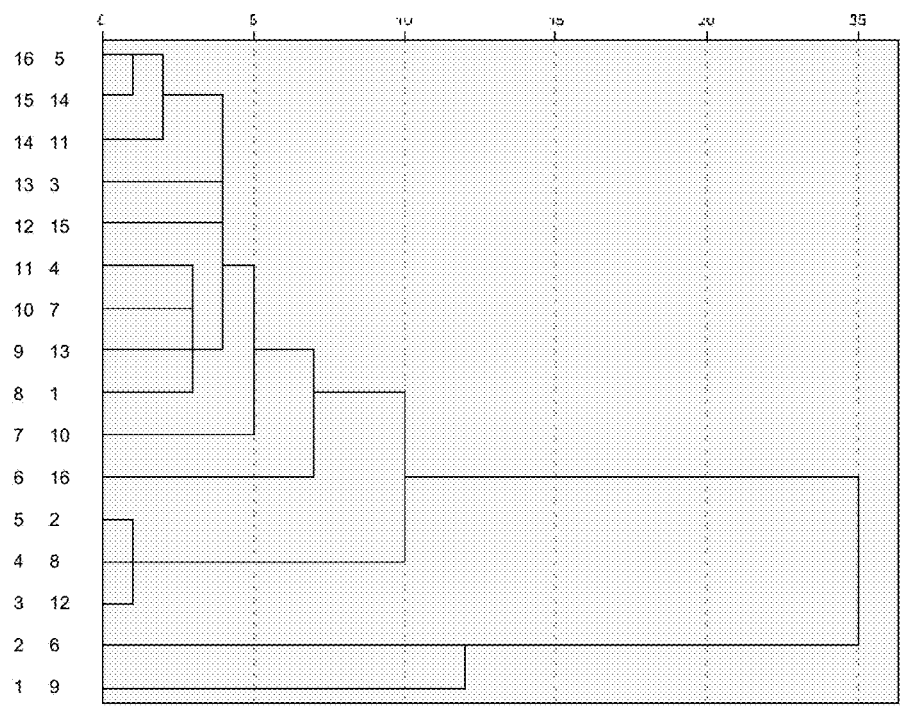
FIG. 4 depicts a dendrogram associated with a hierarchical clustering algorithm in accordance with an embodiment of the invention.

A priori define {|Cl|, D(m, Cl$_{py}$), H$_t$}
AHClustering 0: Each member, m , is placed a single cluster TABLE A-continued Agglomerative Hierarchical Clustering AHClustering 1: At each cluster, Cl , create a
proximity matrix with measure D(m,Cl $_{py}$) where
the initial Cl $_{py}$ is bootstrapped from the first two
samples
AHClustering 2: Combine two clusters into one
cluster given the proximity matrix
AHClustering 3: if D(m, Cl $_{py}$) ≤ H $_t$ then goto
step 1
AHClustering 4: Return dendrogram structure
AHClustering 5: The members, m , in each leaf
node can be used to construct T$_d^f$ Given the variable H$_t$ or the "homophily threshold," the agglomerative clustering will exit when all of the measures between individuals and a cluster are less than or equal the threshold. In essence, H$_t$ bounds the clustering and defines the exit criterion. FIGS. 4 and 5 show an associated dendrogram and associated agglomeration schedule, respectively.

Proof that the resulting fundamental analytic team 20 adheres to the Condorcet jury theorem is as follows. After the application of the kernel function, the probability that a selected member with a greater than half chance of answering a question correctly from a given cluster Cl is 100%.

$$P[m_d > 50\%] = \frac{\sum_{dc=0}^{M_{cl}^{eff}} d_{dc}^{eff}}{\sum_{d=0}^{M_{cl}} d_d} = 100\%$$

The probability that m members will be selected from M possible members of a cluster Cl where each member m may or may not have a correct decision $m_d$ more than half of a given problem set is $$f(m; M_{cl}, p) = Pr(X = m) = \binom{M_{cl}}{m} \cdot (p)^m \cdot (1-p)^{M_{cl}-m}.$$

Since all members M are guaranteed to have a correct decision, $$\binom{M_{cl}}{m}$$

is reduced to $$\binom{m}{m}$$

to represent the possibility of only one outcome.

Furthermore, the probability that all members selected from multiple teams have a c produced by kernel function g and a divisional hierarchical clustering algorithm is given by $$Pr\left(\left(\sum_{m=0}^{Cl} X_m\right) = t\right) = \prod_{m=0}^{Cl} Pr(X_m = m).$$

In essence, $$f(m, M_{cl}, p) = \lim_{limp \to P[m_d > 50\%]} Pr(X = m) = \binom{M_{cl}}{m} \cdot (p)^m \cdot (1-p)^{M_{cl}-m};$$

$$M_{cl} = m \Leftrightarrow \binom{m}{m} \cdot (p)^m \cdot (1-p)^{m-m}$$

where $\lim_{x \to 1}(1-x)^0 = 1$ and $\lim_{x \to 1}(x)^n = 1$ such that $\binom{m}{m} \cdot (p)^m \cdot (1-p)^{m-m} = 100\%$.

Since all selected members are guaranteed to have P[$m_d$>50%] then all of the members selected from multiple teams have $$Pr\left(\left(\sum_{m=0}^{Cl} X_m\right) = t\right) = \prod_{m=0}^{Cl} Pr(X_m = m) = 100\%$$

probability of being P[$m_d$>50%].

As such, with the kernel and hierarchical approach, the result is guaranteed to follow the Condorcet jury theorem.

Figure 3:
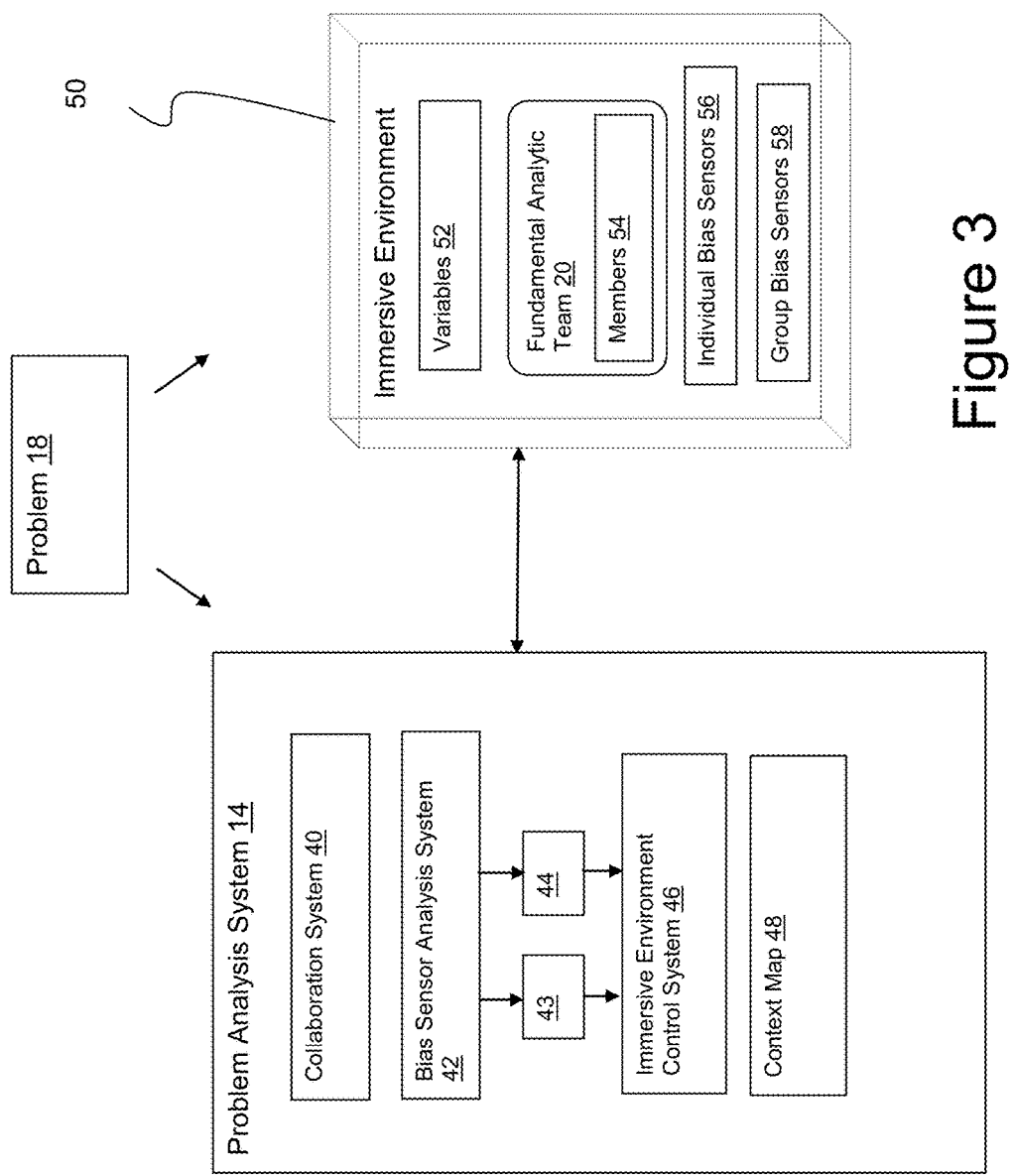
FIG. 3 depicts a problem analysis system in accordance with an embodiment of the present invention.

FIG. 3 provide a more detailed embodiment of a problem analysis system 14 that interacts with immersive environment 50 within which the fundamental analytic team 20 operates to solve problem 18. Problem analysis system 14 may include a collaboration system 40 to provide a platform within which the members 54 analyze and solve the problem 18. Collaboration system 40 may for instance include a centralized server that for example manages processing including assigning tasks and timelines to individual members 54, providing a communication facility for allowing members 54 to communicate with each other via a network, providing a space within a virtual world within which each member operates, etc.

In solving the problem 18, the fundamental analytic team 20 is placed in one or more immersive environments 50. Immersive environment 50 may comprise any type of environment in which members 54 of the analytic team 20 may operate, e.g., a virtual environment such as a virtual universe; a physical space such as a room, workstation(s); a grid or cloud computing environment; a gaming environment, a combination thereof, etc. In addition, although shown with only a single immersive environment 50, it is understood that multiple/different types of immersive environments 50 may be employed, i.e., some members 54 may be in a first type of immersive environment 50 while other members 54 may be in a second type of immersive environment 50.

Regardless of the type or number, each immersive environment 50 includes a set of variables 52 that control aspects of the immersive environment 50. For example, in a physical space such as a room, variables 52 may include temperature, humidity, lighting, music, furniture positioning, etc. In a virtual space, variables 52 may include virtual location, presentation elements such as colors, appearance of avatars, sound levels, 3D effects, etc.

In addition, within each immersive environment 50, each member is monitored with one or more individual bias sensors 56 and the entire team 20 is monitored with one or more group bias sensors. Individual bias sensors 56 are utilized to measure aspects of an individual member that might indicate some bias of the individual. Individual bias sensors 56 may for example measure breathing, heart rate, fatigue, anxiety, movement, etc. Group bias sensors 58 are utilized to measure aspects of the entire team 20 that might indicate a group bias. Group bias sensors 58 may for instance measure the sound volume of the entire team 20, the speed at which the team 20 is working towards a solution, etc.

Data from the individual bias sensors 56 and group bias sensors 58 are fed back into the problem analysis system 14 where bias sensor analysis system 42 analyzes data and determines if either an individual bias condition 43 or group bias condition 44 exists. For example, the heart rate of a first member engaged in a task with a few other members may be abnormally increasing. Based on previous training and analysis input of the first member, this may be known to result in biased decision making on the part of the first member. In another example, the entire team 20 may be engaged in a heated and loud discussion regarding a particular point, which may be known to result in a biased decision being made by the entire team.

Illustrative types of individual biases include, e.g., confirmation bias, fundamental attribution error, blind spot bias, representative bias, anchoring bias and projection bias. Illustrative group biases include, e.g., information cocoons, group extremism, information cascades, and premature hypothesis.

To address bias conditions 43, 44, immersive environment control system 46 may alter the variable within the immersive environment. For example, if an individual bias condition 43 of a given member 54 is issued due to, e.g., high anxiety, the temperature or lighting in the physical space of the given member 54 may be adjusted. Further, if a group bias condition 44 is issued based on a heated and loud discussion, a variable 52 that interrupts the discussion may be employed, e.g., avatars may be temporarily transported to a different area to work on a different part of the problem.

A serial immersive context map 48 may be utilized to evaluate behaviors occurring within different type of immersive environments. For example, the team 20 may be immersed in one of a mirror, virtual, physical, or telephony environment. Different types of biases may present themselves differently depending on the type or types of immersive environment 50 being employed.

Referring back to FIG. 1, bias classification system 15 provides the a priori training needed to evaluate and understand biases for both the individual members 54 and the entire team 20. The fundamental analytic team 20 $T_a^f$ is initially created with m members from the clusters Cl. Each team has a spatially selected immersive environment. As such, the context of decision making is differing between group members from differing teams. Despite a heterogeneous tendency towards an immersive environment type, an analytical session of all members should remain homogenous. By extension, an analytical session A is composed of a series of events $\{A_1, A_2 \ldots A_i \ldots A_{i+1}\}$. Each event is defined by an immersive environment context.

A histogram of $|m_{cl}|$ or the number of members from a particular Cl is within $T_a^f$ is created. A rank proportionate selection, $\alpha_{cl_i}$, is determined for the number of descretized $A_t$ that is attached to a cluster's immersive environment preference.

$$\alpha_{cl_i} = \frac{|m_{cl}|}{|T_a^f|}; 0 \le \alpha_{cl_i} \le 1$$

The number of environments for a given team is calculated with $\#E_{cl} = \alpha_{cl_i}|A|$. The complete possible event paths is $$\prod_{cl=0}^{|Cl|} \#E_{cl}!$$

where a transition from one event to another event is a change within immersive environment context.

Through training, a poisson distributed model that is correlated to social decision making theory guides the selection of transition states.

$$f(k; \lambda) = \frac{\lambda^k e^{-\lambda}}{k!}$$

In one approach, biases may be identified, classified and managed within a gameplay environment. Within pattern recognition, methods such as regressors, classifiers, or density estimators provide predictions from a set of variables. In particular, classifiers separate data groups or vector data into discriminatory space. Ground truth or labeled data provide targets that support supervised learning approaches. Alternatively, unsupervised learning such as clustering techniques segment data based upon inherent features. Within the context of an immersive environment, each game is trained as a Bayesian Belief Network Classifier, such as that shown in FIG. 6.

A game bias classifier training phase produces a Bayesian Belief Network from a cognitive bias elicitation scenario. Each of a set of cognitive solicitation scenarios can be encoded into a game state such that each node, $N_i$ where $i \in \{0, 1, \ldots, \infty\}$, represents an action state whereas an edge, $E_{ij}$ where $i, j \in \{0, 1, \ldots, \infty\}$, is a transition or decision from a $N_i$ to $N_j$. The set of all nodes and edges creates a gaming scenario where $S_{gmn} = \{\forall N, \forall E\}$ and $g \in \{0, 1, \ldots, \infty\}$ $n \in \{1,2,3,4,5,6\}$ $m \in \{0, 1, \ldots, \infty\}$. Each n represents one of the following cognitive biases: Confirmation, Anchor, Representation, Projection, Blind Spot, and Attribution biases while g is a game identifier and m is a scenario enumeration. Each of the scenarios, $S_{gmn}$, are encoded into a game, g.

As a user completes $S_{gmn}$ during training, the probability tables of a belief network m for game g of bias n is learned given the target variable of a bias indicator. The probability of a bias is given by the joint probability $$P(B_n, N_i \ldots N_{i+1} \ldots N_{i+1+l}).$$

Each of the nodes $N_i$ will have a conditional probability table for $P(N_{i+1}|N_i)$. The joint distribution probability is computed using the standard $$P(B_n, N_i, \ldots N_{i+1} \ldots N_{i+1+l}) = P(B_n) \prod_{i=1}^{i} P(N_i | \text{Parents}(N_i)).$$

In other words, an accumulation of evidence provides a probability that an asserted hypothesis occurred.

The evidence for a given bias is gathered through training sessions. The structure or topology of the network is defined a priori by cognitive elicitation models. Each elicitation model provides a sequence of events for a particular story board defined by $S_{gmn}$. As a user plays a scenario within a game, data is gathered at each decision point. The latent processing of the data provides histogram accumulation of evidence for the completion of each conditional probability table.

After a scenario is completed and the state path of the user is recorded, a survey is presented to the player. Each player completes a survey for each scenario. The acquired data from the survey is utilized to yield a label $L_n$ for a sample $D_s$ and action path through the topological network.

$$D_s = \{L_n, N_i \ldots N_{i+1} \ldots N_{i+1+l}\}$$

Figures 6, 7:
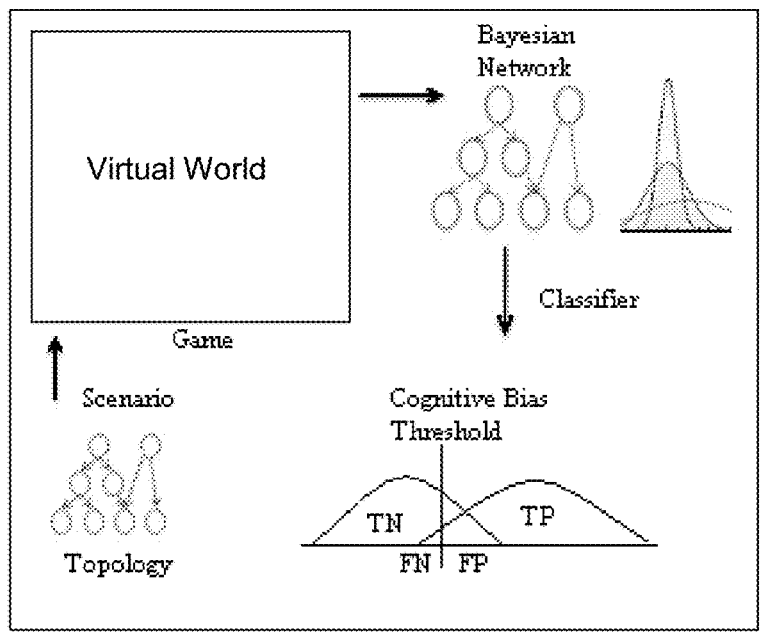
FIG. 6 depicts a Bayesian Belief Network Classifier in accordance with an embodiment of the invention.
FIG. 7 depicts a confusion matrix in accordance with an embodiment of the invention.

After the training stage, each of the underlying models will be tested on the remaining test data $D_s$. The data is stratified into n labeled groups. Each of the data groups produces a confusion matrix as shown in FIG. 7 such that each game's specificity $$Sp = \frac{TN}{TN + FP}$$

and sensitivity $$Se = \frac{TP}{TP + FN}$$

are calculated.

A true positive rate, $$TPR = \frac{TP}{(TP + FN)},$$

and false positive rate, $$FPR = \frac{FP}{(FP + TN)}$$

are plotted to produce a Receiver Operating Characteristic curve. ROC curves can be used to compare classifiers. The area under the curve yields an approximation for the quality of a classifier. The integral of $$auc = \int_0^1 ROC(x)$$

provides the area under the curve. However, this result does not account for skew. Instead, the Matthews Correlation Coefficient (MCC) provides a numerical value in $[-1,1]$.

$$MCC = \frac{TP * TN - FP * FN}{\sqrt{(TP+FP)(TP+FN)(TN+FP)(TN+FN)}}$$

The MCC is related to the Chi-Square statistic with $$\chi^2 = (|MCC|)^2 * o$$

where o is the total number of observations. The Chi-Squared value table provides a significance probability for the classifier. Both the MCC and significance values produce an ordered list of preferred games for a specific bias classification.

Generalized Game Play Modeling

A General Bayesian Network Classifier (GBNC) models a scenario, $S_{gmn}$, that elicits a bias. The conditional probability tables are constructed from the stratified training $D_s$ while the topology of the network is designed by cognitive. A frequentist approach with knowledge accumulation provides empirical probabilities. The Markov property of d-separation enables the calculation of probabilities. The root node is the class or prior probability of a bias. Each of the 6 biases maintains a GBNC for each game. The total amount of GBNC's is $GBNC_\# = 6 * G_\#$ where $G_\#$ is the number of games.

As a user plays the most relevant game for a bias, a particular scenario is scripted. An online classification for AP is produced for all $GNCC_\#$.

$$AP = \{N_i \ldots N_{i+1} \ldots N_{i+1+l}\}$$

If the action path produced by a user is classified into a differing bias above a learned threshold $\alpha$, the game changes. Alternatively, if the classification probability is below the required exit criteria, another script for an identical bias elicitation is played. The type of bias script is played until the user's engagement deteriorates. If at the end of the session $\alpha$ has not been exceeded, the user does not exhibit the bias or has learned to mitigate the bias through previous gaming.

When $\alpha$ has been surpassed for the correct bias classification, the game alerts the user of the bias and recommends future avoidance actions. Through gaming reinforcement learning, the user understands how to identify a bias. Furthermore, the avoidance action recommendations provide exemplars for the user to mitigate a bias in future scenarios.

Individualized Game Play Modeling

Given the trained GNBC's, a short round of threshold, $\alpha$, learning will be initialized at the beginning of each game. A bias elicitation script evokes an action path AP. The AP is classified by each GNBC for calibration purposes. A short survey retrieves hidden cognitive information from the user to determine if the appropriate bias, $S_{gmn}$, occurred and to what magnitude, $\beta$. An acceptance threshold $\alpha$ is calculated with $$\alpha = P(B_n, N_i \ldots N_{i+1} \ldots N_{i+1+l}) *_{??}$$

When a probability is above $\alpha$, a bias $B_n$ occurred.

The engagement of a player is of great importance for the pedagogical use of the games. A natural extension of the GNBC model building is to produce engagement models along the edges of the belief network. As a user moves from $N_{i+1}$ to $N_{i+1+l}$ along edge $E_{i+1,i+1+l}$, a Gaussian model for reaction time produces a density estimator. The GNBC contains $$GNBC = \{N \cup E \cup B\}.$$

The familiar normal distribution $$f(x) = \frac{1}{\sqrt{2\pi\sigma^2}} e^{-\frac{(x-\mu)^2}{2\sigma^2}}$$

is the basis of the edge models. Outlier detection from the z-score of the form $$z = \frac{x-u}{\sigma}$$

determines the probability of obtaining a reaction time. If the z-score is statically low, (t(z)≤5%), the game changes in-play characteristics such as color and sound to regain attention. If the change in game characteristics does not improve the next z-score, the scenario is switched. Following, if the z-score still does not improve, the entire game is switched.

There are significant opportunities to use optimized team building in a wide number of games both for entertainment purposes as well as serious games. With the ability for a game to report on the optimal team based on game play, organizations are given the opportunity to have a system be able to recommend people based on quantifiable skillsets based on how people co-interact in a virtual environment. An example where this could be critical, are supply chain games or games meant to determine the best team for a particular project. An example of a game where this could be applicable would be the IARPA game that is meant to train intelligence analysts how to recognize and mitigate cognitive biases. This game could then recommend a team of analysts who have been designated to work together based on their analytical skill sets.

Adaptive gameplay is important for all kinds of different games for single player to multiplayer. This approach lends to a more engaging experience, sophisticated games that can recommend levels of gameplay dynamically based on what has been completed to date and how the player has reacted to in game events. This approach could be used in FPS games, role playing games, simulated games etc., a truly cross-genre function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized method for training a bias classifier for an immersive environment, comprising:
encoding a cognitive solicitation scenario into a game having a set of action nodes, wherein each action node is identified with a set of possible bias classifications;
providing a training mode in which each of a set of users traverses the set of action nodes and generates a bias probability at each action node, the training mode including:
associating at least one individual bias sensor with each user in the set of users;
associating at least one group bias sensor with the set of users;
monitoring at least one aspect of each user in the set of users using the at least one individual bias sensor and determining an existence of an individual bias condition;
monitoring at least one aspect of the set of users using the at least one group bias sensor associated with the set of users and determining an existences of a group bias condition; and
altering at least one aspect of the immersive environment to compensate for at least one of the individual bias condition or the group bias condition,
wherein the immersive environment comprises a physical space, and wherein altering the at least one aspect of the immersive environment includes altering at least one of a temperature or a light level of the physical space;
separating bias probability data from different user scenarios into groups and determining a specificity measure and a sensitivity measure for each group; and
analyzing true positive rates and false positive rates for each group to determine a quality of the group as a bias classifier.

2. The computerized method of claim 1, wherein the specificity measure indicates a likelihood of giving a false positive response.

3. The computerized method of claim 1, wherein the sensitivity measure indicates a likelihood of giving a false negative response.

4. The computerized method of claim 1, wherein the set of possible bias classifications include Confirmation, Anchor, Representation, Projection, Blind Spot, and Attribution biases.

5. The computerized method of claim 1, further comprising calculating a Matthews Correlation Coefficient (MCC) and a significance probability for the classifier based on the specificity measure and the sensitivity measure for each group.

6. The computerized method of claim 5, further comprising selecting a preferred game for a specific bias classification based on the MCC and the significance probability for the classifier.

7. A computer program product stored on a computer readable storage medium, which when executed by a computing system, trains a bias classifier for an immersive environment, comprising:
program code for encoding a cognitive solicitation scenario into a game having a set of action nodes, wherein each action node is identified with a set of possible bias classifications;
program code for providing a training mode in which each of a set of users traverses the set of action nodes and generates a bias probability at each action node, the training mode including:
associating at least one individual bias sensor with each user in the set of users;
associating at least one group bias sensor with the set of users;
monitoring at least one aspect of each user in the set of users using the at least one individual bias sensor and determining an existence of an individual bias condition;
monitoring at least one aspect of the set of users using the at least one group bias sensor associated with the set of users and determining an existences of a group bias condition; and
altering at least one aspect of the immersive environment to compensate for at least one of the individual bias condition or the group bias condition, wherein the immersive environment comprises a physical space, and wherein altering the at least one aspect of the immersive environment includes altering at least one of a temperature or a light level of the physical space;

program code for separating bias probability data from different user scenarios into groups and determining a specificity measure and a sensitivity measure for each group; and program code for analyzing true positive rates and false positive rates for each group to determine a quality of the group as a bias classifier.

8. The program product of claim 7, wherein the specificity measure indicates a likelihood of giving a false positive response.

9. The program product of claim 7, wherein the sensitivity measure indicates a likelihood of giving a false negative response.

10. The program product of claim 7, wherein the set of possible bias classifications include: Confirmation, Anchor, Representation, Projection, Blind Spot, and Attribution biases.

11. A system for training a bias classifier for an immersive environment, comprising:
    a system for encoding a cognitive solicitation scenario into a game having a set of action nodes, wherein each action node is identified with a set of possible bias classifications;
    a training mode in which each of a set of users traverses the set of action nodes and generates a bias probability at each action node, the training mode including:
        associating at least one individual bias sensor with each user in the set of users;
        associating at least one group bias sensor with the set of users;
        monitoring at least one aspect of each user in the set of users using the at least one individual bias sensor and determining an existence of an individual bias condition;
        monitoring at least one aspect of the set of users using the at least one group bias sensor associated with the set of users and determining an existences of a group bias condition; and
        altering at least one aspect of the immersive environment to compensate for at least one of the individual bias condition or the group bias condition, wherein the immersive environment comprises a physical space, and wherein altering the at least one aspect of the immersive environment includes altering at least one of a temperature or a light level of the physical space;
    a system for separating bias probability data from different user scenarios into groups and determining a specificity measure and a sensitivity measure for each group; and
    a system for analyzing true positive rates and false positive rates for each group to determine a quality of the group as a bias classifier.

12. The system of claim 11, wherein the specificity measure indicates a likelihood of giving a false positive response.

13. The system of claim 11, wherein the sensitivity measure indicates a likelihood of giving a false negative response.

14. The system of claim 11, wherein the set of possible bias classifications include: Confirmation, Anchor, Representation, Projection, Blind Spot, and Attribution biases.

* * * * *